United States Patent
Pandya et al.

(10) Patent No.: US 8,352,803 B2
(45) Date of Patent: Jan. 8, 2013

(54) FRAMEWORK FOR MANAGING FAILURES IN OUTBOUND MESSAGES

(75) Inventors: Ajay Kirit Pandya, Ottawa (CA); Robert Alexander Mann, Carp (CA); Mike Vihtari, Ottawa (CA)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 12/795,265

(22) Filed: Jun. 7, 2010

(65) Prior Publication Data

US 2011/0302458 A1 Dec. 8, 2011

(51) Int. Cl.
*G06F 11/00* (2006.01)

(52) U.S. Cl. ............. 714/49; 709/223; 714/4.1; 714/18; 714/55

(58) Field of Classification Search ............... 714/4.1, 714/18, 49, 55; 709/223
See application file for complete search history.

(56) References Cited

U.S. PATENT DOCUMENTS

| | | | |
|---|---|---|---|
| 7,889,650 B2* | 2/2011 | Duan ............................ | 370/230 |
| 7,961,706 B2* | 6/2011 | Huang et al. .................. | 370/349 |
| 8,009,573 B2* | 8/2011 | Duan ............................ | 370/252 |
| 8,031,677 B1* | 10/2011 | Wu et al. ....................... | 370/331 |
| 8,041,825 B2* | 10/2011 | Gibbs et al. ................... | 709/229 |
| 2009/0182883 A1* | 7/2009 | Giaretta et al. ............... | 709/228 |
| 2011/0138235 A1* | 6/2011 | You et al. ........................ | 714/49 |
| 2011/0202647 A1* | 8/2011 | Jin et al. ......................... | 709/223 |
| 2011/0208853 A1* | 8/2011 | Castro-Castro et al. ....... | 709/223 |
| 2011/0225280 A1* | 9/2011 | Delsesto et al. ............... | 709/223 |
| 2012/0096177 A1* | 4/2012 | Rasanen ........................ | 709/228 |

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

*Primary Examiner* — Joshua P Lottich
(74) *Attorney, Agent, or Firm* — Kramer & Amado, PC

(57) ABSTRACT

Various exemplary embodiments relate to a method and related network node including one or more of the following: receiving, at a policy and charging rules node (PCRN), a request from a requesting node for an establishment of a first service data flow (SDF); generating a first rule set for implementing the first SDF in response to the request; transmitting a first rule of the rule set to a first node for installation of the first rule; waiting for a period of time for a response from the first node; determining from the response whether installation of the first rule at the first node failed or succeeded; and if installation of the first rule succeeded, transmitting a second rule of the first rule set to a second node for installation of the second rule.

20 Claims, 9 Drawing Sheets

| | MESSAGE PRESENT IN OLD TREE | MESSAGE TRANSMITTED IN OLD TREE | MESSAGE PRESENT IN NEW TREE | ACTION |
|---|---|---|---|---|
| 950 | Y | Y | Y | USE MESSAGE IN NEW TREE |
| 955 | Y | Y | N | DO NOTHING |
| 960 | Y | N | Y | MERGE MESSAGES |
| 965 | Y | N | N | USE MESSAGE IN OLD TREE |
| 970 | N | N | Y | USE MESSAGE IN NEW TREE |
| 975 | N | N | N | DO NOTHING |

FRAMEWORK FOR MANAGING FAILURES IN OUTBOUND MESSAGES

TECHNICAL FIELD

Various exemplary embodiments disclosed herein relate generally to policy and charging in telecommunications networks.

BACKGROUND

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "long term evolution" (LTE). In an LTE network, all communications are carried over an IP channel from user equipment (UE) to an all-IP core called the evolved packet core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the policy and charging rules function (PCRF), policy and charging enforcement function (PCEF), and bearer binding and event reporting function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the installation of rules by the PCRF on the various elements associated with the EPC. The standards specify that when an element encounters an error installing a rule, it should report this error to the PCRF. Thereafter, the PCRF should instruct all other relevant elements to uninstall the rule since it may not be operable. This process, however, introduces a significant amount of overhead to the process of ensuring that failed rules to not remain installed on other elements.

In view of the foregoing, it would be desirable to provide a robust and efficient system for installing rules. In particular, it would be desirable to provide a system that minimizes processing overhead associated with the handling of failures such as failed rule installations.

SUMMARY

In light of the present need for a robust and efficient system for installing rules, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: receiving, at a policy and charging rules node (PCRN), a request from a requesting node for an establishment of a first service data flow (SDF); generating a first rule set for implementing the first SDF in response to the request; transmitting a first rule of the rule set to a first node for installation of the first rule; waiting for a period of time for a response from the first node; determining from the response whether installation of the first rule at the first node failed or succeeded; and if installation of the first rule succeeded, transmitting a second rule of the first rule set to a second node for installation of the second rule.

According to the foregoing, a system that minimizes processing overhead associated with the handling of failures such as failed rule installations. Particularly, by waiting for a response to at least some transmitted messages, a PCRN may intelligently respond to notices of failure and eliminate instructions or other actions rendered unnecessary or unhelpful by the failure.

BRIEF DESCRIPTION OF THE DRAWINGS

In order to better understand various exemplary embodiments, reference is made to the accompanying drawings, wherein.

DETAILED DESCRIPTION

Figure 1:
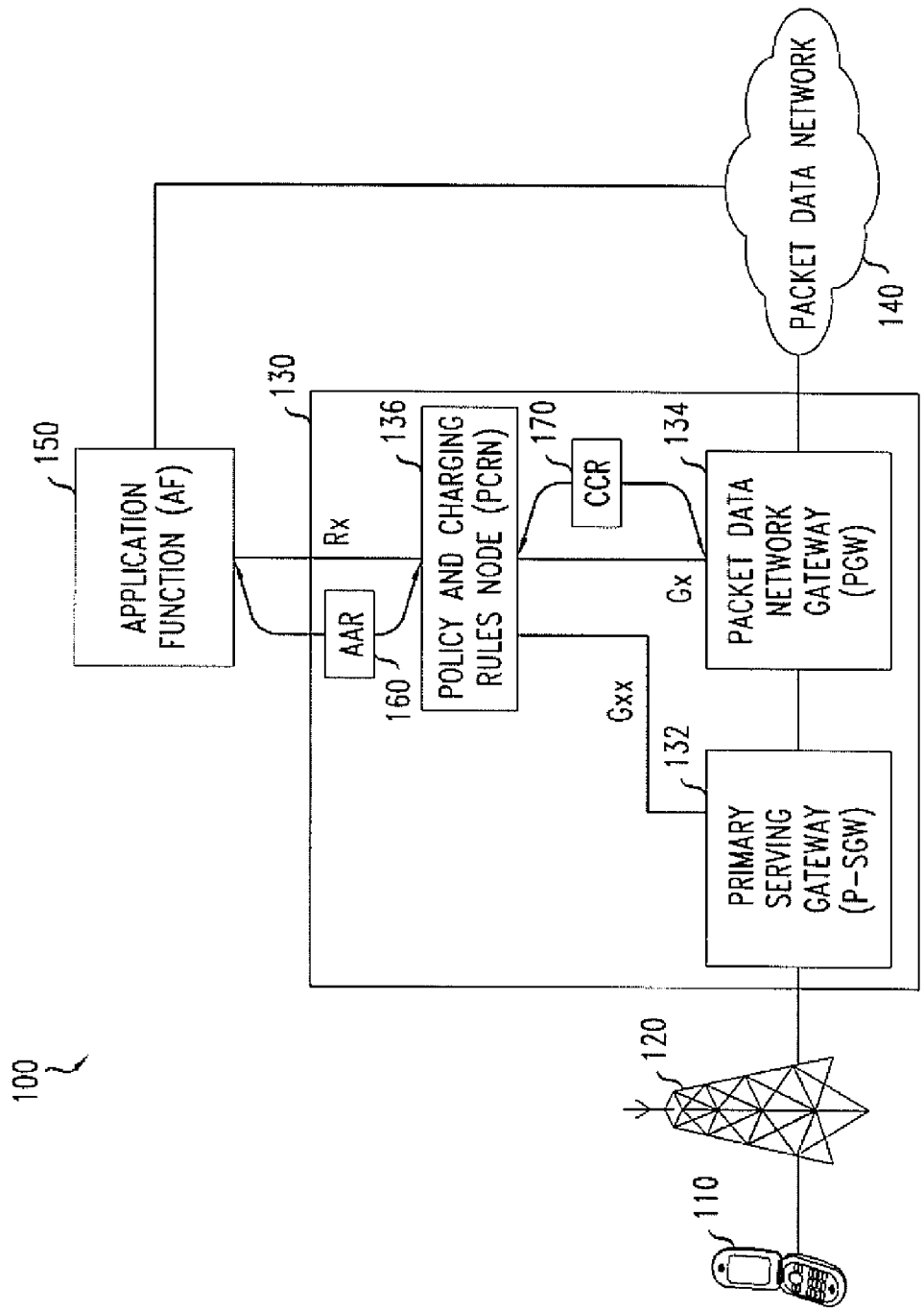
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, packet data network 140, and application function (AF) 150.

User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138. Alternatively, EPC 130 may be any other packet core known to those of skill in the art.

Primary serving gateway (P-SGW) 132 may be a device that provides gateway access to the EPC 130 to an end user of network 100. P-SGW 132 may be the first device within the EPC 130 that receives packets sent by user equipment 110. P-SGW 132 may forward such packets toward PGW 134. P-SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP (PMIP) standard, P-SGW 132 may include a bearer binding and event reporting function (BBERF). In various exemplary embodiments, EPC 130 may include multiple serving gateways (SGWs) (not shown) and each SGW may communicate with multiple base stations (not shown). In such embodiments, additional SGWs (not shown) may be designated as non-primary SGWs (NP-SGWs) (not shown) for user equipments 110.

Packet data network gateway (PGW) 134 may be a device that provides gateway access to packet data network 140 to an end user of network 100. PGW 134 may be the final device within the EPC 130 that receives packets sent by user equipment 110 toward packet data network 140 via P-SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. Upon receiving a request for an unknown application service from UE 110, PGW 134 may construct a credit control request (CCR) requesting an appropriate allocation of resources and forward the request to PCRN 136.

It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices. Alternatively, non-LTE networks such as, for example, GPRS or 4G, could be used.

Policy and charging rules node (PCRN) 136 may be a device that receives requests related to service data flows (SDFs) and IP-CAN sessions, generates PCC rules, and provides PCC rules to the PGW 134 and/or other PCENs (not shown). PCRN 136 may be in communication with AF 150 via an Rx interface. PCRN 136 may receive an application request in the form of an AA-request (AAR) 160 from AF 150. Upon receipt of AAR 160, PCRN 136 may generate at least one new PCC rule for fulfilling the application request 160.

PCRN 136 may also be in communication with SGWs, such as P-SGW 132, and PGW 134 via a Gxx and a Gx interface, respectively. PCRN 136 may receive a request in the form of a credit control request (CCR) 170 from SGW 132 or PGW 134. As with AAR 160, upon receipt of CCR 170, PCRN may take appropriate action in response, such as, for example, generating at least one new PCC rule for fulfilling and/or responding to the CCR 170. In various embodiments, AAR 160 and CCR 170 may represent two independent requests to be processed separately, while in other embodiments, AAR 160 and CCR 170 may carry information regarding a single request, and PCRN 136 may take action based on the combination of AAR 160 and CCR 170. In various embodiments, PCRN 136 may be capable of handling both single-message and paired-message requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate quality of service (QoS) rules. Upon creating a new QoS rule or upon request by the SGW 132, PCRN 136 may provide a QoS rule to SGW 132 via the Gxx interface.

As will be described in further detail below with respect to FIGS. 2-11, if installation of a rule fails at any element such as, for example, P-SGW 132, that element may inform PCRN 136 that the rule could not be installed. Subsequently, PCRN 136 may take action to ensure that the rule does not remain installed at any other elements. For example, PCRN 136 may instruct PGW 134 to uninstall the rule if it has already been installed. Alternatively, PCRN 136 may refrain from instructing PGW 134 to install the rule altogether, thereby obviating the need to send an uninstall instruction.

Packet data network 140 may be a network (e.g., the Internet or another network of communications devices) for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110.

Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an AA-request (AAR) 160 defined by the Diameter protocol, to notify the PCRN 136 that resources should be allocated for the application service. This application request message may include information such as an identification of a subscriber using the application service and an identification of the particular service data flows desired to be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-11.

PCRN 136 may receive a request for establishment of two service data flows (SDFs) such as, for example, AAR 160. PCRN 136 may create two sets of rules for implementing the two SDFs, rule set A and rule set B. PCRN 132 may then send an instruction in the form of a re-authorization request (RAR) to P-SGW 132 to install an appropriate rule, such as a QoS rule, from each rule set A and B. Thereafter, PCRN 136 may wait for P-SGW to respond to the RAR with a re-authorization answer (RAA) indicating whether the installation succeeded or failed for either of the two rules. If, for example, P-SGW 132 successfully installed QoS rule B but was unable to install QoS rule A, it may send an RAA to the PCRN 136 indicating this condition. PCRN 136 may then refrain from instructing any further nodes from installing rules from rule set A. For example, PCRN 136 may proceed by sending a second RAR to PGW 134 instructing it to install only one appropriate rule, such as a PCC rule, from rule set B.

Figure 2:
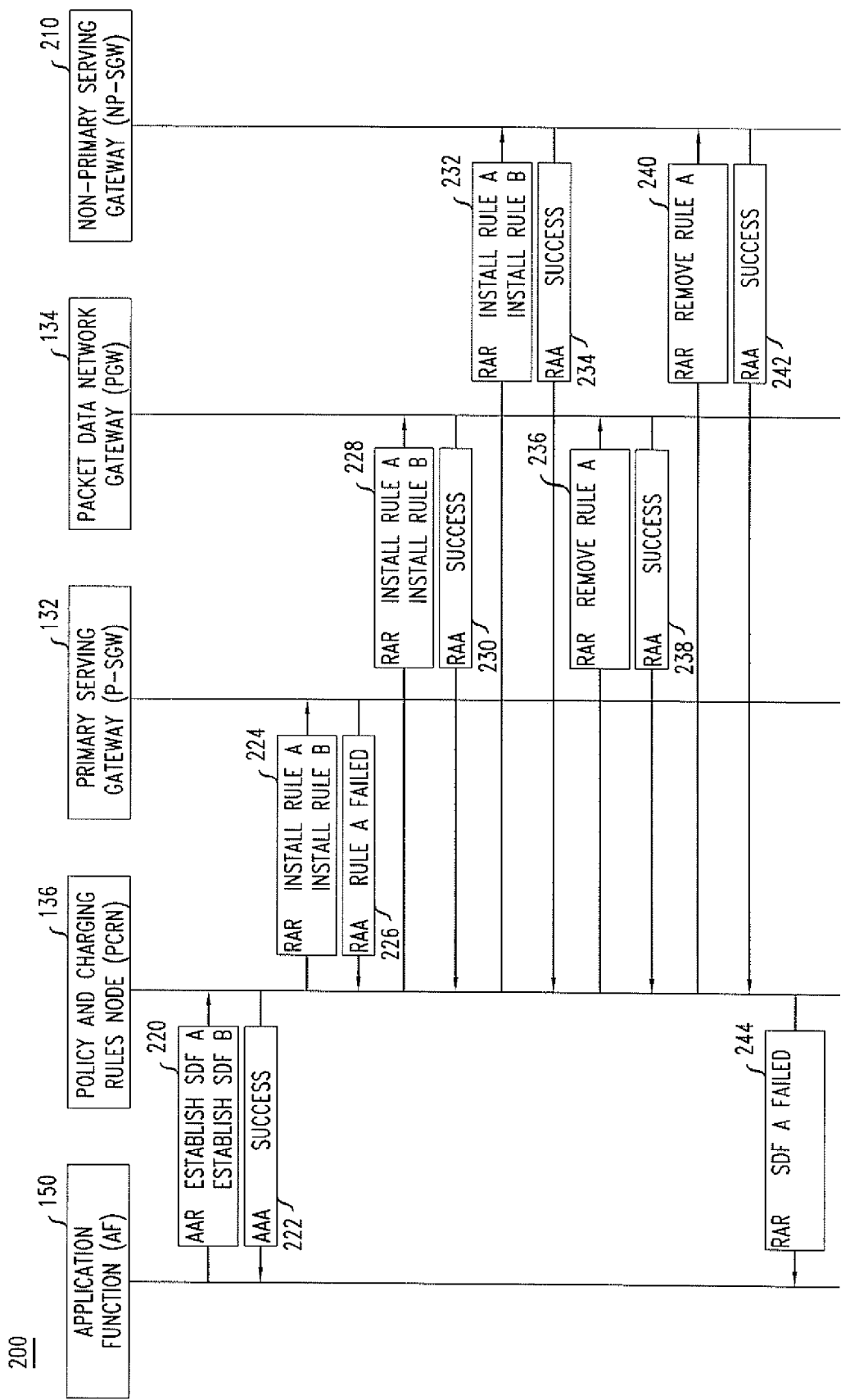
FIG. 2 illustrates an exemplary message exchange for installing rules and then uninstalling the failed rules at various nodes.

FIG. 2 illustrates an exemplary message exchange 200 for installing rules and then uninstalling the failed rules at various nodes. Message exchange 200 may occur between AF 150, PCRN 136, P-SGW 132, PGW 134, and NP-SGW 210.

Message exchange 220 may begin when AF 150 sends an AAR 220 to PCRN 136 requesting the establishment of two SDFs, SDF A and SDF B. PCRN 136 may respond by first sending an AA-answer (AAA) 222 back to AF 150 indicating that the request was successfully received and/or corresponding rules were successfully generated. PCRN 136 may also proceed by installing rules in each of the relevant nodes by sending a RAR 224 to P-SGW 132, a RAR 228 to PGW 134, and a RAR 232 to NP-SGW 210. Each RAR 224, 228, 232 may indicate that the receiving node should install Rule A and Rule B for implementing SDF A and SDF B, respectively. It should be noted that corresponding rules in different RARs 224, 228, 232 may not be identical. For example, RAR 224 and 232 may contain QoS rules while RAR 228 may contain PCC rules. The terms "Rule A" and "Rule B" are used generally to refer to any applicable rule for implementing the corresponding SDF.

PCRN 136 may not wait for a response from a node before proceeding to send out the next RAR 228 or 232. Thus, each RAA 225, 230, 234 may arrive at any time after the corresponding RAR 224, 228, 232 was sent, without regard to any other messages. For example, RAA 226 may arrive immediately after RAR 224 or after arrival of RAA 234.

In exemplary message transfer 200, while RAAs 230, 234 indicate total success in installing the rules at the applicable nodes, P-SGW 132 may not be able to install Rule A. This could occur due to various factors, such as insufficient resources or a malformed rule. Regardless of cause, PCRN 136 may receive RAA 226 and determine that rule A should be uninstalled from all other nodes. Accordingly, PCRN may transmit RAR 236 to PGW 132 and RAR 240 to NP-SGW 210, indicating that rule A should be uninstalled. PGW 132 and NP-SGW 210 may respond with RAAs 238, 242, respectively, indicating successful un-installation of rule A. Finally, exemplary message exchange 200 may end when PCRN 136 transmits an RAR 244 to AF 150 indicating that SDF A could not be established as a result of the failure at P-SGW 132.

Figure 3:
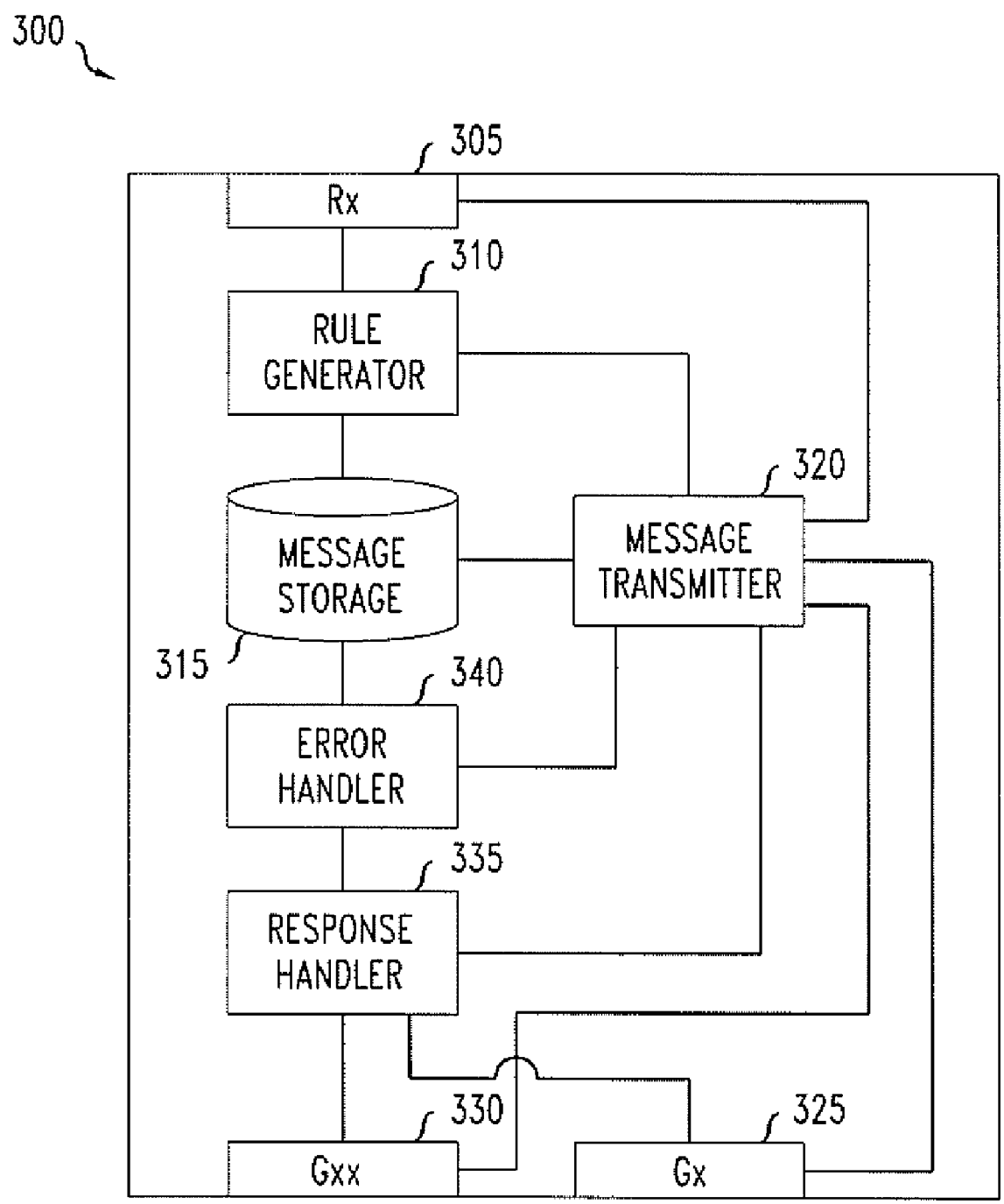
FIG. 3 illustrates an exemplary policy and charging rules node (PCRN) for managing failures in outbound messages.

FIG. 3 illustrates an exemplary policy and charging rules node (PCRN) 300 for managing failures in outbound messages. PCRN 300 may correspond to PCRN 136 and may include Rx interface 305, rule generator 310, message storage 315, message transmitter 320, Gx interface 325, Gxx interface 330, response handler 335, and error handler 340.

Rx interface 305 may be an interface comprising hardware and/or executable instructions encoded on a machine-readable storage medium configured to communicate with an AF such as AF 150. Such communication may be implemented according to the 3GPP TS 29.214. For example, Rx interface 215 may receive application requests, session requests, and event notifications in the form of an AAR and transmit answers and other status notifications in the form of an AAA or RAR.

Rule generator 310 may include hardware and/or executable instructions on a machine-readable storage medium configured to receive a request for the establishment of at least one SDF via Rx interface 305, Gx interface 325, and/or Gxx interface 330, and to generate one or more set of rules for establishing the requested SDFs. Rule generator 310 may use information contained in the request, information from a subscriber profile repository (SPR) (not shown), the results of a policy decision (not shown), and or any other information or methods recognized by those of skill in the art as useful in generating appropriate rules for each SDF.

After generating rule sets for establishing requested SDFs, rule generator 310 may further create an ordered set of messages for installing the rules in the appropriate network elements. Rule generator 310 may store the ordered set of messages in message storage 315. For example, rule generator may create a message set including a RAR instructing P-SGW 132 to install a QoS rule, a RAR instructing PGW 134 to install a PCC rule, and a RAR instructing NP-SGW 210 to install a QoS rule. The message set may be ordered and/or hierarchical, thereby indicating an order in which the contained messages should be transmitted.

In various embodiments, messages may be classified as either critical or noncritical. A critical message may correspond to a message destined for an element that must install the contained rules for the SDF to be established. For example, if P-SGW 132 or PGW 134 fails to install a rule, the SDF may not be properly established. In such a case, the message destined for P-SGW 132 or PGW 134 may be deemed a critical message. A noncritical message, on the other hand, may correspond to a message destined for an element that is not essential to implementing an SDF. For example, if NP-SGW 210 fails to install a rule, the corresponding SDF may still be functional if the corresponding rules were successfully installed at other network elements. In such a case, the message destined for NP-SGW 210 may be deemed a noncritical message. In various embodiments, rule generator 310 may indicate whether a message is critical or noncritical by, for example, setting a critical/noncritical flag associated with the message or placing a message at an appropriate point within a hierarchy of the message set.

Message storage 315 may be any machine-readable medium capable of storing a set of messages for transmission to other nodes in connection with the establishment of at least one SDF. Accordingly, message storage 315 may include a machine-readable storage medium such as read-only memory (ROM), random-access memory (RAM), magnetic disk storage media, optical storage media, flash-memory devices, and/or similar storage media. As will be described in further detail below with respect to FIGS. 5-8, rule storage 235 may store messages in one of many possible data structures such as, for example, an ordered list or a tree.

Message transmitter 320 may include hardware and/or executable instructions on a machine-readable storage medium configured to transmit messages from message storage 315 to the appropriate recipient. For example, message transmitter 320 may receive an indication from rule generator 310 that a set of messages is ready to be sent. Message transmitter 320 may then retrieve the first message from the set of messages and transmit it toward the appropriate recipient. For example, if the first message in the message set is a RAR for transmission to P-SGW 132, message transmitter 315 may transmit the RAR to P-SGW 132 via Gxx interface 330. Upon transmitting a message, message transmitter may mark the message as sent in message storage 315 or remove the message from the set of messages.

After transmitting a message, message transmitter 320 may wait for an indication that it should send the next message in the message set. Such indication may come from, for example, rule generator 310, response handler 335, and/or error handler 340. In various embodiments where messages within the message set are classified as critical or noncritical, rule generator 310 may only wait in this manner after it has transmitted a critical message. In such embodiments, rule generator 320 may move on to immediately transfer the next message after transmitting a noncritical message. Message transmitter 320 may be adapted to determine whether a message is critical or noncritical by, for example, reading a flag associated with the message, observing the position of the message within a hierarchy, or making a determination itself based on the message type and/or recipient. Other methods of determining the critical nature of a message will be apparent to those of skill in the art.

Gx interface 325 may be an interface comprising hardware and/or executable instructions encoded on a machine-readable storage medium configured to communicate with a PGW such as PGW 134. Such communication may be implemented according to the 3GPP TS 29.212. Thus, Gx interface 325 may receive transmit PCC rules for installation and receive answers indicating whether rule installations were successful. Gx interface 325 may further receive UE-originated application requests, session requests, and event notifications in the form of a CCR.

Gxx interface 330 may be an interface comprising hardware and/or executable instructions encoded on a machine-readable storage medium configured to communicate with an SGW such as P-SGW 132 and/or NP-SGW 210. Such communication may be implemented according to the 3GPP TS 29.212. Thus, Gxx interface 330 may transmit QoS rules for installation and receive answers indicating whether rule installations were successful. Gxx interface 330 may further receive UE-originated application requests, session requests, and event notifications in the form of a CCR.

Response handler 335 may include hardware and/or executable instructions on a machine-readable storage medium configured to receive and handle a response via the Rx interface 305, Gx interface 325, and/or Gxx interface 330. For example, P-SGW 132, PGW 134, and/or NP-SGW 210 may be adapted to send replies in the form of an RAA indicating whether the installation of a rule or rules was successful. Upon receiving such a message, response handler 335 may determine whether the message indicates a total success in rule installation. If so, response handler 335 may send an indication to message transmitter 320 that the next message from the relevant message set should be sent out. If, on the other hand, the message indicates any failure in rule installation, response handler 335 may pass the received response message to error handler 340.

Error handler 340 may include hardware and/or executable instructions on a machine-readable storage medium configured to received and process messages indicating a failure in installation of one or more rules. In various embodiments that classify messages as critical or noncritical, error handler 340 may first determine whether the response was sent in response to a critical or noncritical message. If the response message was sent in response to a noncritical message, error handler 340 may simply take no action or indicate to message transmitter 320 that the next message from the appropriate message set should be sent.

If on the other hand, the response is in response to a critical message error handler 340 may take steps to modify the appropriate set of messages in message storage 315. Similar action may be taken for all response messages in embodiments that do not classify messages as critical or noncritical. As will be described in greater detail below with respect to FIGS. 5-11, error handler 340 may remove, modify, and/or add messages to the associated message set. For example, error handler 340 may ensure that no further instructions are transmitted installing the failed rule. Further, error handler 340 may add messages reporting the failure of SDF establishment back to a requesting device. Finally, after completing any appropriate modifications to the message set in message storage 315, error handler 340 may send an indication to message transmitter 320 that it should transmit the next message in the message set.

Figure 4:
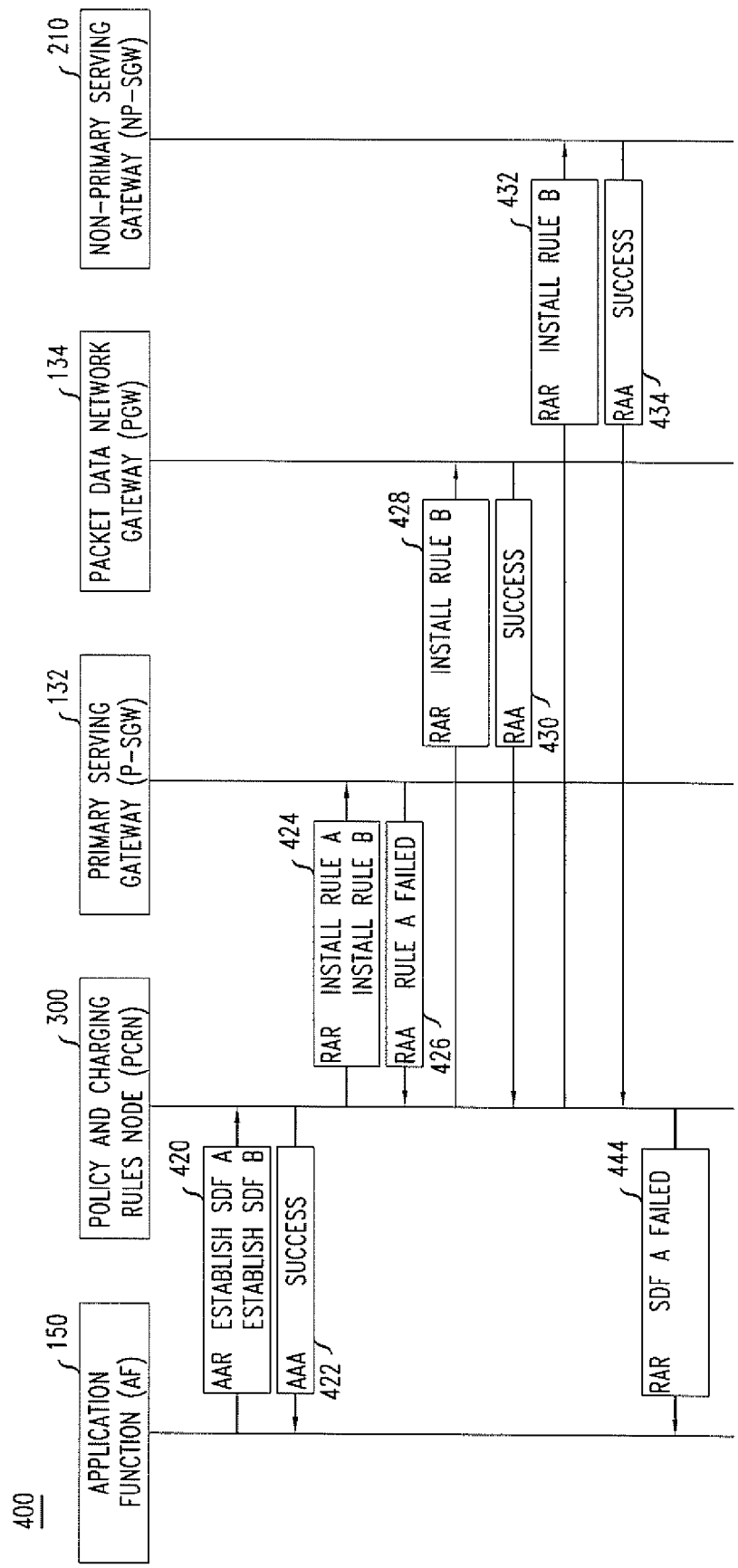
FIG. 4 illustrates an exemplary message exchange for managing failures in outbound messages.

FIG. 4 illustrates an exemplary message exchange 400 for managing failures in outbound messages. Message exchange 400 may occur between AF 150, PCRN 300, P-SGW 132, PGW 134, and NP-SGW 210.

Message exchange 220 may begin when AF 150 sends an AAR 220 to PCRN 300 requesting the establishment of two SDFs, SDF A and SDF B. PCRN 300 may respond by first sending an AA-answer (AAA) 222 back to AF 150 indicating that the request was successfully received and/or corresponding rules were successfully generated. In various alternative embodiments, PCRN 300 may not immediately send AAA 422 after receiving AAR 420 and may, instead, wait until after PCRN 300 has attempted to install the rules at each of the appropriate nodes 132, 134, 210. PCRN 300 may proceed by attempting to install the rules A and B in P-SGW 132 transmitting RAR 424. Thereafter, PCRN 300 may wait for RAA 426 from P-SGW 132 before taking further action with respect to the establishment of SDFs A and B.

After receiving RAA 426, PCRN 300 may determine that the installation of rule A at P-SGW 132 has failed. Consequently, the next message sent by PCRN 300, for example RAR 428, may only instruct PGW 134 to install rule B. Again, PCRN 300 may wait for a response before proceeding. After receiving RAA 430, PCRN 300 may determine that the installation of rule B was a success, and proceed to transmit RAR 432. After NP-SGW 210 responds with RAA 434 that the installation of rule B was successful, PCRN 300 may transmit a RAR 444 to AF 150 indicating that the establishment of SDF A has failed. In various alternative embodiments wherein PCRN 300 waits to answer AAR 220 until PCRN 300 has attempted to install all appropriate rules in the relevant devices 132, 134, 210, PCRN 300 may transmit an AAA (not shown) to indicate the failure with regard to SDF A instead of both AAA 422 and RAR 444. In various embodiments, RAR 444, or its alternative AAA (not shown), may include information helpful to AF 150 or any other requesting node in determining the reason for SDF establishment failure and/or useful in modifying the request so that an alternative SDF may be requested.

Figure 5:
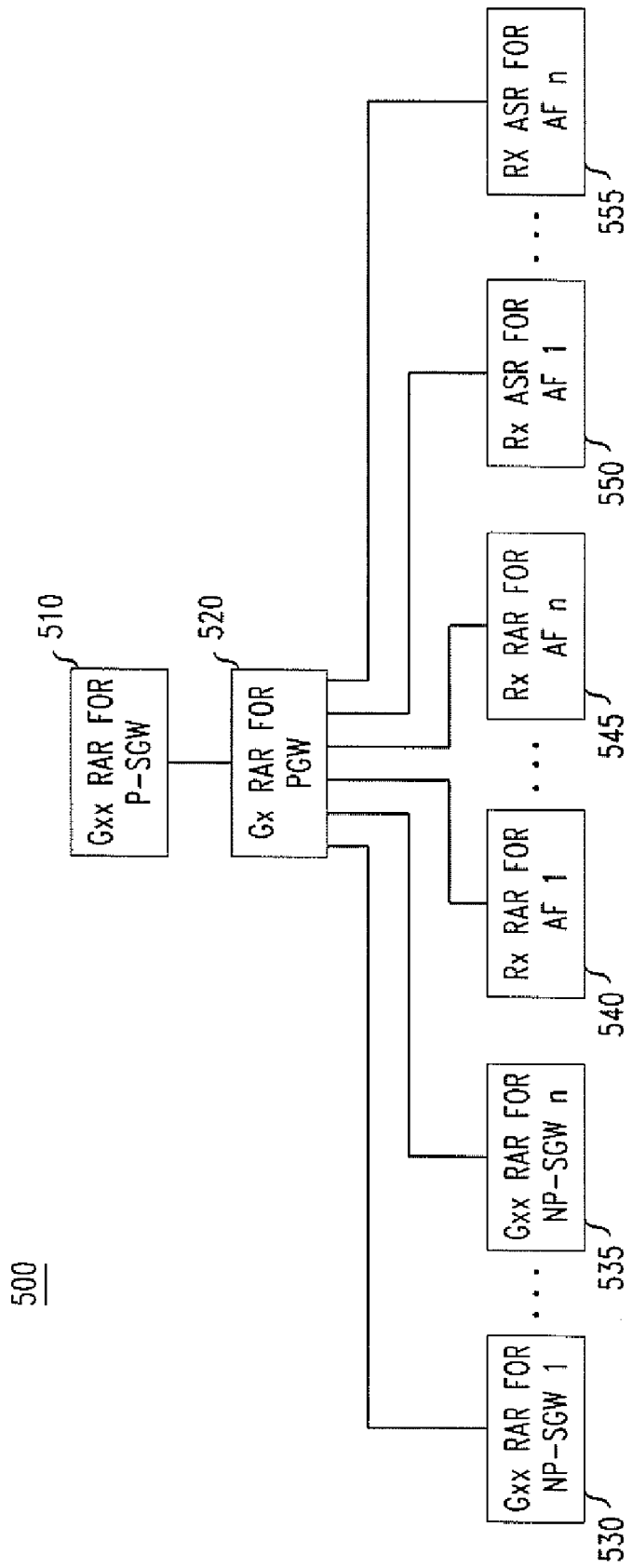
FIG. 5 illustrates an exemplary generic message tree for transmitting messages to various nodes.

FIG. 5 illustrates an exemplary generic message tree 500 for transmitting messages to various nodes. Message tree 500 may be used by PCRN 300 in constructing various message trees such as, for example, those trees described in detail with respect to FIGS. 6-8, in order to determine an appropriate position within an ordered set of messages to place a particular message. Thus, message tree 500 may be, for example, a template or reference data structure. In various alternative embodiments, the behavior of PCRN 300 in constructing message trees may be defined in other manners such as, for example, hard coding or rules defined for use by a rule engine. In such embodiments, generic message tree 500 may simply be an abstracted example for illustration purposes.

Generic message tree 500 may include a plurality of messages 510, 520, 530, 535, 540, 545, 550, 555. The position of a message within the hierarchy of generic message tree 500 may indicate an ordered position for transmission of the message and/or whether the message is critical. As an example, in various embodiments, since message 510 is at the top of the tree, it may indicate that a RAR for the applicable P-SGW should be the first message to be transmitted. Further, because message 510 has no sibling messages, PCRN 300 may wait for a response to arrive from the P-SGW before transmitting any other message.

Next, message 520 may indicate that a RAR should be transmitted to the appropriate PGW after receiving a response from the P-SGW. Again, message tree 500 may indicate, through the fact that message 520 has no sibling messages, that PCRN 300 should wait for a response from the PGW before moving on.

Messages 530, 535 may represent any number of messages. Messages 530, 535 may further indicate that any RAR destined for a NP-SGW should be transmitted after a response is received from the PGW. In various embodiments, because messages 530, 535 are sibling nodes, PCRN 300 may immediately transmit all messages corresponding to messages 530, 535. Likewise, PCRN may immediately transmit messages corresponding to messages 540, 545, which may be any RAR destined for an appropriate AF, and/or messages corresponding to messages 550, 555, which may be any ASR destined for an appropriate AF.

It should be noted that generic message tree 500 may not necessarily be an actual message tree containing actual messages for transmission. As such, actual message trees may not include all messages included in generic message tree 500. For example, a message tree may include an ASR for transmission to an AF because all SDF establishments have failed but may not include a RAR for transmission to the same AF, because such a message may be redundant or otherwise inappropriate.

Further, various embodiments may include variations on generic message tree 500. For example, message 520 may be the root of the tree and message 510 may be a chilled of message 520. Such a tree may indicate that a RAR should be sent to a PGW first, and then to a P-SGW. As another example, in various embodiments, such as those embodiments that do not utilize a bearer binding and reporting function (BBERF), generic message tree 500 may not include messages 510, 530, 535 at all. Further variations on generic message tree 500 will be apparent to those of skill in the art.

Figure 6:
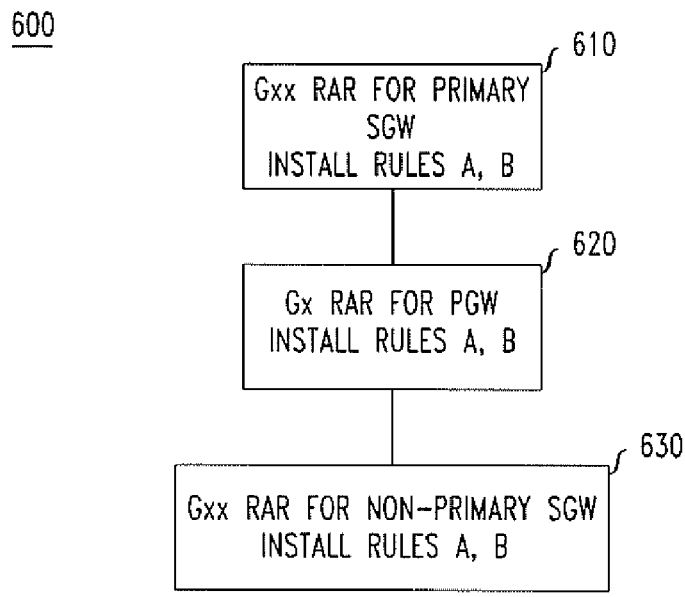
FIG. 6 illustrates an exemplary message tree for installing rules at various nodes.

FIG. 6 illustrates an exemplary message tree 600 for installing rules at various nodes. Message tree 600 may be generated in response to a request for the establishment of two SDFs, A and B, such as, for example, AAR 420 of FIG. 4. Message tree 600 may include three messages 610, 620, 630 for installing two rules, A and B, among various appropriate network devices. The placement of messages in message tree 600 may indicate in what order the messages are intended to be transmitted by a PCRN such as PCRN 300. Various embodiments may order messages differently. For example, message 620 may be the first message, followed by message 610, and the message 630. Any ordering scheme recognized as useful to those of skill in the art may be used.

For example, message 610 may be the first message intended to be transmitted by PCRN 300 and may be a RAR for instructing P-SGW 132 to install rules A and B. Message 610 may include QoS rule definitions for establishing SDFs A and B. Message 620 may be a RAR intended for transmission to PGW 134 after the transmission of message 610. Message 620 may include PCC rule definitions for establishing SDFs A and B. Finally, message 630 may be a RAR intended for transmission to NP-SGW 210 after the transmission of message 620. Message 630 may also include QoS rule definitions for establishing SDFs A and B.

It should be apparent that message tree 600, as well as any subsequently-described message trees, is intended as one example of a message tree. Depending on various factors such as, for example, the number and types of network elements associated with user equipment 110 and whether PCRN 300 immediately responds to an AAR, message tree 600 may contain additional messages. For example, PCRN may contain additional messages similar to message 630 for transmission to other NP-SGWs (not shown). As a further example, message tree may contain an AAA for reporting the success or failure of SDF establishment to any appropriate AFs such as, for example, AF 150. Further, in various networks that do not include or do not install rules on particular nodes, messages addressed to those nodes may be omitted. For example, in an embodiment that does not install QoS rules on SGWs, message tree 600 may not include messages 610 and 630.

Figure 7:
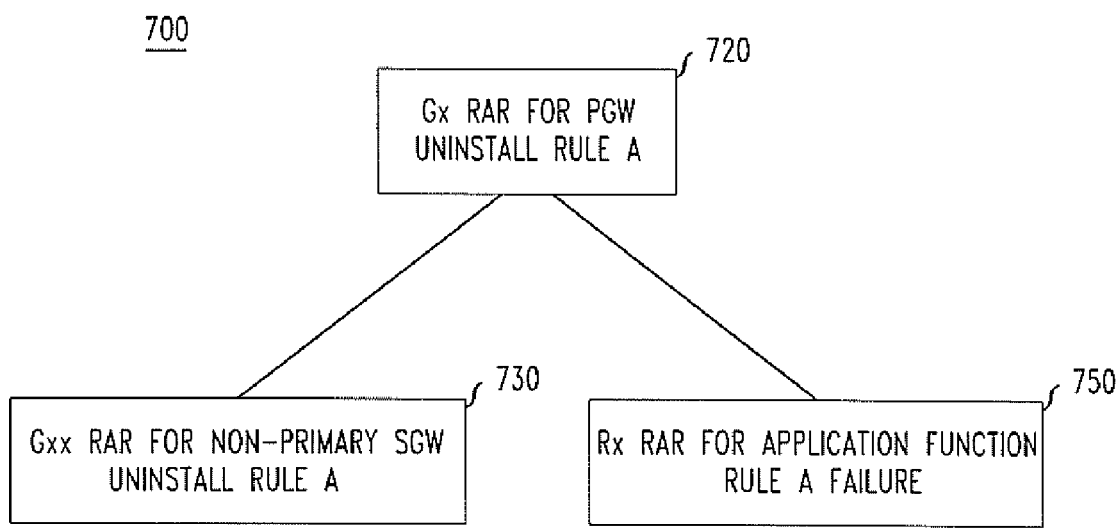
FIG. 7 illustrates an exemplary message tree for uninstalling rules at various nodes.

FIG. 7 illustrates an exemplary message tree 700 for uninstalling rules at various nodes. Message tree 700 may be generated in response to an indication that the installation of a rule has failed at another node, such as, for example, RAA 426 of FIG. 4. Message tree 700 may include three messages 720, 730, 750 for uninstalling rule A and notifying an AF as to the SDF establishment failure.

For example, message 720 may be the first message to be transmitted and/or considered by PCRN 300. Message 720 may be a RAR for transmission to PGW 134 and may instruct PGW 134 to uninstall rule A. Message 730 may be a RAR for transmission to NP-SGW 210 after transmission of message 720. Message 730 may instruct NP-SGW 210 to uninstall rule A as well. Finally, message 750 may be a RAR for transmission to AF 150 after transmission of message 720 and may inform AF 150 as to the failure in establishing SDF A. Message 750 may further include information for use by the AF 150 in determining what the SDF failed and/or how it may successfully request an alternative SDF.

It should be noted that the tree structure of message tree 700 may imply a non-critical nature of messages 730 and 750. Both message 730 and message 750 depend from message 720. In embodiments where message tree 700 is to be transmitted as-is, a PCRN may wait for a response to message 720 from another network node before transmitting another message. After receiving such a response, the PCRN may transmit messages 730 and 750 without waiting for any other responses first.

As with message tree 600, message tree 700 may include additional and/or alternative messages depending on the embodiment and/or the circumstances. For example, in various embodiments, PCRN 300 may be required to instruct the node that failed to install a rule to uninstall the same rule. In such a case, message tree 700 may include an additional message (not shown) instructing the P-SGW 132 to uninstall rule A.

Figures 8, 9:
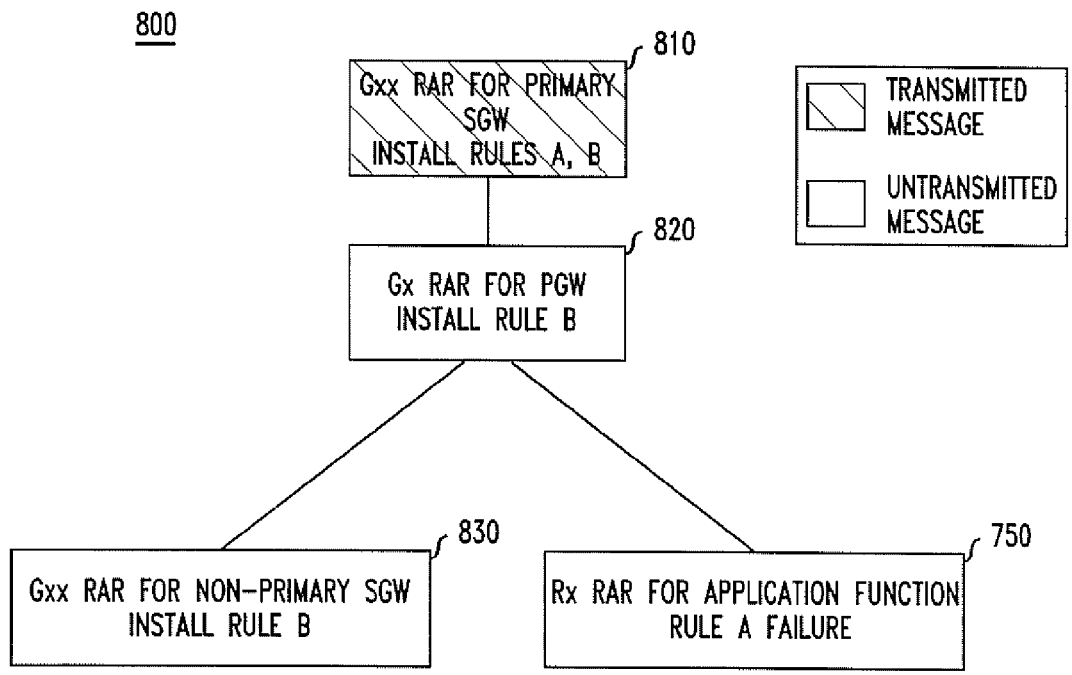
FIG. 8 illustrates an exemplary message tree for managing failures in rule installation.
FIG. 9 illustrates an exemplary data arrangement for merging message trees.

FIG. 8 illustrates an exemplary message tree 800 for managing failures in rule installation. Message tree 800 may be the result of combining message trees 600 and 700. The combination of message trees may include the combination of messages. PCRN 300 may, for example, determine whether a message contained in message tree 600 corresponds to a different message in message tree 700. PCRN 300 may make this determination based on, for example, the type of message and/or the recipient of the message. PCRN 300 may then combine two corresponding messages to generate a new message that accomplishes the goals of both messages. Some messages such as, for example, message 810, may have already been transmitted or otherwise executed, as indicated by the shaded box. In various alternative embodiments, transmitted messages may simply be removed from message tree 800.

Message tree may contain four messages 810, 820, 830, 750. Message 810 may be similar to message 610 of message tree 600. Message 810 may be unaltered by the combination of message trees 600 and 700 because no corresponding message existed in message tree 700 and/or because message 810 had already been transmitted to P-SGW 132, as indicated by the shading of message 810.

Message 820 may be intended for transmission after transmission of message 810. Because message 810 may have already been transmitted, message 820 may effectively be the first transmitted message from the new message tree 800. Message 820 may be a result of combining message 620 and message 720. For example, because message 620 instructed PGW 134 to install rules A and B and message 720 instructed the same device to uninstall rule A, message 820 may simply instruct PGW 820 to install rule B. For similar reasons, message 820 may be based on the merging of messages 630 and 730 and may instruct NP-SGW 210 to install only rule B. Message 750 may be added to message tree 800 directly from message tree 700 because message tree 600 contained no corresponding message.

FIG. 9 illustrates an exemplary data arrangement 900 for merging message trees. Data arrangement may be used by error handler 340 to determine how to combine two message trees such as, for example, message trees 600 and 700. Data arrangement 900 may be, for example, a table in a database stored in error handler 340, message storage 315, or at any other element internal or external to PCRN 300 and accessible by error handler 340. Alternatively, data arrangement 900 could be a series of linked lists, an array, a similar data structure, or hard coded into the operation of PCRN 300. Thus, it should be apparent that data arrangement 400 is an abstraction of the underlying data; any data structure suitable for storage of the underlying data may be used.

Data arrangement 900 may contain four fields: message present in old tree field 910, message transmitted in old tree field 920, message present in new tree field 930, and action field 940. The term "old tree" may refer to a tree existing before the receipt of an error message such as, for example, message tree 600. The term "new tree" may refer to a tree generated in response to an error message such as, for example, message tree 700. Message present in old tree field 910 may be a field for indicating a logic value as to whether a message of a given type exists in the old tree. Message transmitted in old tree field 920 may be a field indicating a logic value as to whether a message of a given type has been transmitted in the old tree. Message present in new tree field 930 may be a field for indicating a logic value as to whether a message of a given type exists in the new tree. Finally, action field 940 may indicate an action to be taken when a record is applicable to a particular message or set of messages.

As an example, record 950 may indicate that when corresponding messages exist in both the old tree and the new tree, but the message in the old tree has already been transmitted, the message in the new tree should be used as-is. Record 955 may indicate that when a message that has been transmitted in the old tree does not correspond to any message in the new tree, nothing should be done with respect to that message. Record 960 may indicate that when corresponding messages exist in both the old tree and the new tree, and the message in the old tree has not already been transmitted, the two messages should be merged to produce a single message. Record 965 may indicate that when an un-transmitted message in the old tree has no corresponding message in the new tree, the old message should be used as-is. Record 970 may indicate that when a message in the new tree does not correspond to any message in the old tree, the new message should be used as is. Finally, record 975 may indicate that no action is taken when no messages are being considered.

Figure 10:
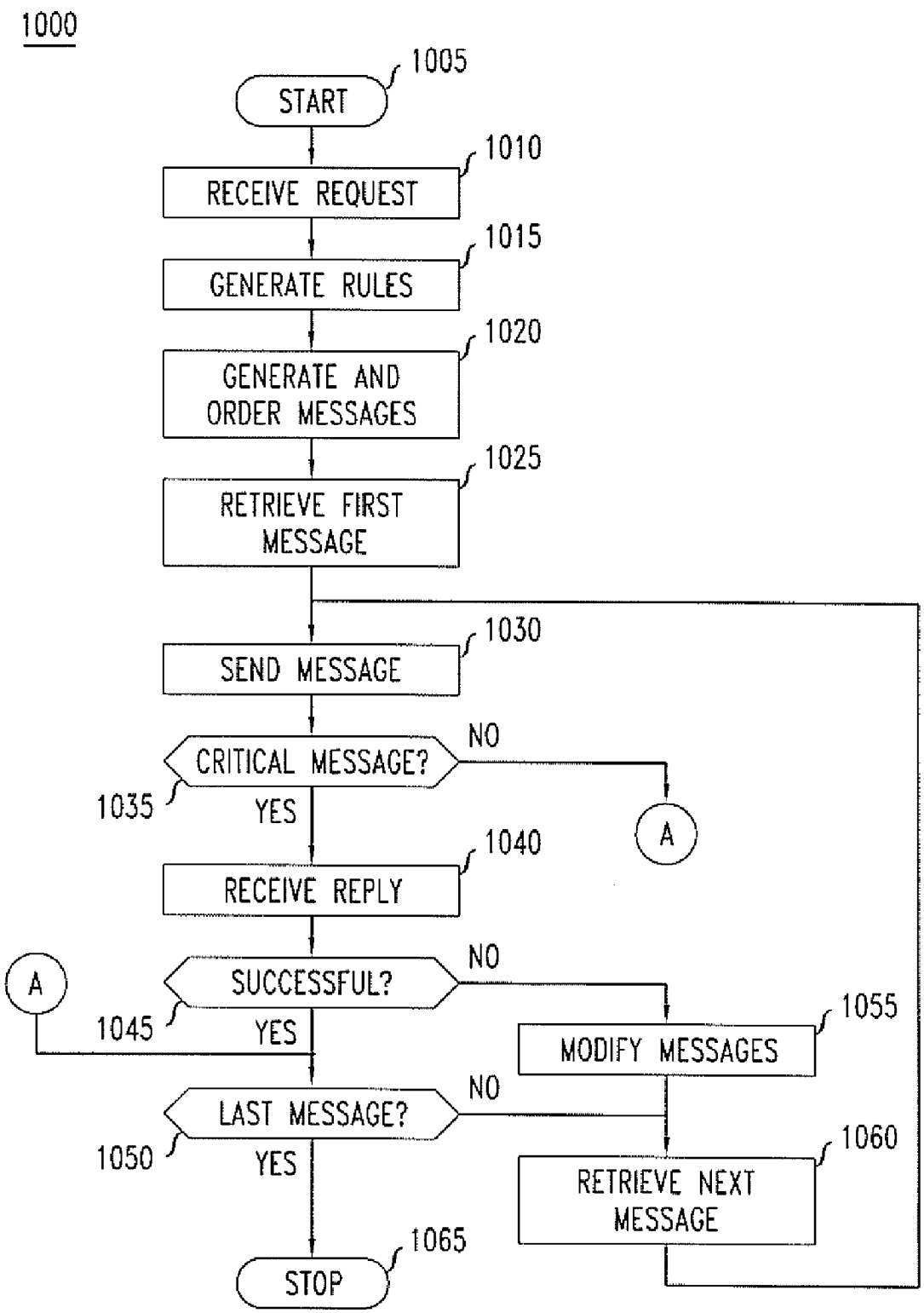
FIG. 10 illustrates an exemplary method for managing failures in outbound messages.

FIG. 10 illustrates an exemplary method 1000 for managing failures in outbound messages. Method 1000 may be performed by the components of PCRN 300 such as, for example, rule generator 310, message transmitter 320, response handler 335, and/or error handler 340.

Method 1000 may begin in step 61005 and proceed to step 1010 where PCRN 300 may receive a message requesting, for example, the establishment of one or more SDFs. PCRN 300 may then, in step 61015, generate at least on set of rules for establishing the requested SDFs. Method 900 may then proceed to step 1020 where PCRN 300 may generate and order a number of messages for installing the rules in various appropriate network nodes. At step 61025, PCRN 400 may retrieve the first message in the ordered set of messages and subsequently transmit the message in step 1030 to its intended recipient.

In step 61035, PCRN may determine whether the message that has just been transmitted was a critical message by, for example, determining whether the message was marked as critical and/or considering the message recipient. If the message was critical method 1000 may proceed to step 1040. Otherwise, method 1000 may proceed directly to step 1050. In various embodiments, PCRN 300 may not discriminate between critical and non-critical messages and may simply proceed to step 1040 as if all messages are critical. In step 1040, PCRN 300 may wait to receive a response to the transmitted message. After receiving a response, PCRN 300 may determine whether that response indicates a successful installation in step 61045. If the installation was successful, method 1000 may proceed to step 1050. If the response indicates any failure in rule installation, method 1000 may proceed to step 61055, where PCRN 300 may modify the messages to be transmitted in accordance with the response. This modification may be performed according to any method known to those of skill in the art or according to the methods presented herein and described in further detail below with respect to FIG. 11.

PCRN 300 may determine, in step 1050, whether that last message has been transmitted by, for example, determining whether any un-transmitted messages exist in the ordered message set. If no messages remain to be transmitted, method 1000 may end in step 61065. If there are still message to transmit, PCRN 300 may retrieve the next message in step 1060 and method 1000 may loop back to step 1030.

Figure 11:
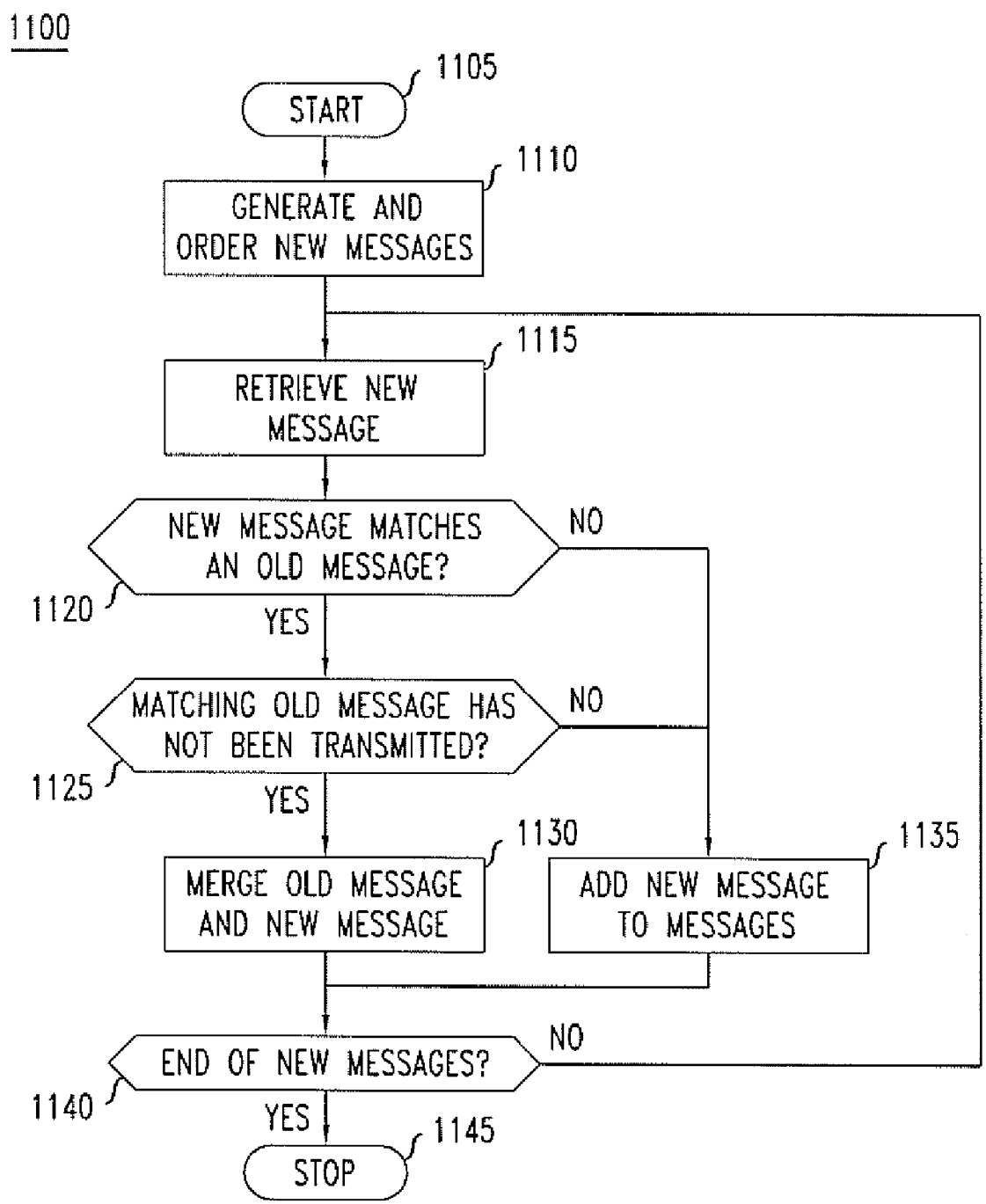
FIG. 11 illustrates an exemplary method for merging message groups.

FIG. 11 illustrates an exemplary method 1100 for merging message groups. Method 1100 may correspond to step 61055 of method 1000 and may be performed by the components of PCRN 300 such as, for example, error handler 340.

Method 1100 may begin in step 1105 and proceed to step 1110 where, in response to an indication of rule failure, PCRN 300 may generate and order a new set of messages. Then, in step 1115, PCRN 300 may retrieve a new message from the new set of messages. In step 1120, PCRN 300 may determine whether the new message matches any old message in the main set of messages previously generated, for example, according to method 1000 or a prior execution of method 1100. PCRN 300 may make this comparison according to, for example, the message types and/or recipients. If there is a match, method 1100 may proceed to step 1125. Otherwise, method 1100 may proceed to step 1135.

In step 1125, PCRN 300 may determine whether the matching old message has yet to be transmitted by, for example, determining whether a flag associated with the message has been set. In various embodiments where messages are simply removed from the set of messages after transmission, method 1100 may skip step 1125. If the old message has not been transmitted, method 1100 may proceed to step 1130. Otherwise, method 1100 may proceed to step 1135.

PCRN 300 may merge the matching messages in step 1130 to produce a single message that accomplishes the combined goals of the two messages. Such merging of messages may be accomplished according to any method known to those of skill in the art. Various combinations of messages may also cancel out. For example, if one message is meant to install a rule and a corresponding message is meant to uninstall the same rule, the resulting message may simply contain neither instruction.

Method 1100 may execute step 1135 if either the new message has no matching old message, as determined by step 1120, or if a corresponding old message exists but has already been transmitted, as determined by step 1125. In step 1135, PCRN 300 may simply add the new message to the main set of messages as-is. Method 1100 may then proceed to step 1140, where PCRN 1140 may determine whether there are any additional messages in the new set of messages to process. If all messages have been processed, method 1100 may simply end in step 1145. On the other hand, if the new set of messages still contains unprocessed messages, method 1100 may loop back to step 1115.

According to the foregoing, various exemplary embodiments provide for a system that minimizes processing overhead associated with the handling of failures such as failed rule installations. Particularly, by waiting for a response to at least some transmitted messages, a PCRN may intelligently respond to notices of failure and eliminate instructions or other actions rendered unnecessary or unhelpful by the failure.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for managing failures performed at a policy and charging rules node (PCRN), the method comprising:
   receiving, at the PCRN, a request from a requesting node for an establishment of a first service data flow (SDF);
   generating a first rule set for implementing the first SDF in response to the received request;
   transmitting a first rule of the generated first rule set to a first node for installation of the first rule;
   waiting for a period of time for a response from the first node;
   determining from the response from the first node whether the installation of the first rule at the first node failed or succeeded; and
   if the installation of the first rule succeeded, transmitting a second rule of the generated first rule set to a second node for installation of the second rule.

2. The method of claim 1, further comprising, if the installation of the first rule failed:
   refraining from transmitting the second rule to the second node; and
   transmitting a message to the requesting node indicating that the establishment of the first SDF failed.

3. The method of claim 2, wherein the request from the requesting node requests an establishment of a second SDF and further comprising:
   generating a second rule set for implementing the second SDF in response to the request from the requesting node;
   transmitting a third rule of the generated second rule set with the first rule of the generated first rule set to the first node for installation of the first rule and the third rule;
   determining from the response from the first node whether the installation of the third rule at the first node failed or succeeded; and
   if the installation of the third rule succeeded, transmitting a fourth rule of the generated second rule set to the second node for installation of the fourth rule, wherein the fourth rule is transmitted regardless of whether the installation of the first rule at the first node succeeded.

4. The method of claim 1, wherein the step of determining comprises:
   determining whether the response from the first node arrived before the period of time elapsed; and
   if the response from the first node did not arrive, determining that the installation of the first rule failed.

5. The method of claim 1, further comprising, if the installation of the first rule was successful:
   determining whether the transmission of the second rule to the second node is critical or non-critical;
   if the transmission of the second rule to the second node is critical:
      waiting, after transmitting the second rule to the second node, for a period of time for a response from the second node,
      determining from the response from the second node whether the installation of the second rule at the first node failed or succeeded,
      if the installation of the second rule succeeded, transmitting a third rule of the first rule set to a third node for installation of the third rule, and
      if the installation of the second rule failed, refraining from transmitting the third rule to the third node; and
   if the transmission of the second rule to the second node is non-critical,
      immediately transmitting the third rule to the third node for installation.

6. The method of claim 1, wherein the second rule is the first rule.

7. The method of claim 1, wherein the requesting node is either the first node or the second node.

8. A hardware policy and charging rules node (PCRN) comprising:
   a plurality of interfaces including a first interface that receives a request message from a requesting node, the received request message comprising a request for an establishment of a service data flow (SDF);
   a rule generator that generates a rule set for implementing the SDF and generates an ordered set of messages for installing rules of the generated rule set at other nodes;
   a message transmitter that transmits a first message from the ordered set of messages to a first node via an interface of the plurality of interfaces, waits for an indication that a message from the ordered set of messages should be transmitted, and transmits a second message from the ordered set of messages to a second node via an interface of the plurality of interfaces; and
   a response handler that receives a response from the first node via the interface of the plurality of interfaces, determines from the response from the first node whether the installation of all rules indicated in the first message was successful, and if the installation of all rules indicated in the first message was successful, sends an indication to the message transmitter that a message from the ordered set of messages should be transmitted.

9. The hardware PCRN of claim 8, wherein the message transmitter further determines whether the second message is critical or non-critical, if the second message is critical:
   waits for the indication that the message from the ordered set of messages should be transmitted, and
   transmits a third message from the ordered set of messages to a third node via the interface of the plurality of interfaces; and
if the second message is non-critical:
   immediately transmits the third message to the third node.

10. The hardware PCRN of claim 8, further comprising:
    an error handler that receives the response from the response handler when the installation of at least one rule indicated in the first message was not successful, modifies the ordered set of messages based on the response from the first node, and sends an indication to the message transmitter that a message from the ordered set of messages should be transmitted.

11. The hardware PCRN of claim 10, wherein the error handler further determines whether a period of time has elapsed after the message transmitter transmits the first message, if the period of time has elapsed and a response from the first node has not arrived, determines that the installation of all rules indicated in the first message was not successful.

12. The hardware PCRN of claim 10, wherein, in modifying the ordered set of messages, the error handler generates a new set of messages based on the response from the first node, for each new message in the new set of messages:
    determines whether the set of ordered messages includes an untransmitted old message that corresponds to the new message,
    if the set of ordered messages includes the untransmitted old message that corresponds to the new message:
       merges the new message with the untransmitted old message to create a merged message, and
       adds the merged message to the set of ordered messages; and
    if the set of ordered messages does not include the untransmitted old message that corresponds to the new message:
       adds the new message to the set of ordered messages.

13. The hardware PCRN of claim 8, wherein the ordered set of messages is a tree.

14. A non-transitory storage medium encoded with instructions for managing failures performed at a policy and charging rules node (PCRN), the non-transitory storage medium comprising:
    instructions for receiving, at the PCRN, a request from a requesting node for an establishment of a first service data flow (SDF);
    instructions for generating a first rule set for implementing the first SDF in response to the request from the requesting node;
    instructions for transmitting a first rule of the generated first rule set to a first node for installation of the first rule;
    instructions for waiting for a period of time for a response from the first node;
    instructions for determining from the response from the first node whether the installation of the first rule at the first node failed or succeeded; and
    instructions for, if the installation of the first rule succeeded, transmitting a second rule of the first rule set to a second node for installation of the second rule.

15. The non-transitory storage medium of claim 14, further comprising:
    instructions for, if the installation of the first rule failed:
       refraining from transmitting the second rule to the second node; and
    instructions for transmitting a message to the requesting node indicating that the establishment of the first SDF failed.

16. The non-transitory storage medium of claim 15, wherein the request from the requesting node requests an establishment of a second SDF and further comprising:
    instructions for generating a second rule set for implementing the second SDF in response to the request from the requesting node;

instructions for transmitting a third rule of the generated second rule set with the first rule of the first rule set to the first node for installation of the first rule and the third rule;

instructions for determining from the response from the first node whether the installation of the third rule at the first node failed or succeeded; and instructions for, if the installation of the third rule succeeded, transmitting a fourth rule of the second rule set to the second node for installation of the fourth rule, wherein the fourth rule is transmitted regardless of whether the installation of the first rule at the first node succeeded.

17. The non-transitory storage medium of claim 14, wherein the instructions for determining comprise:

instructions for determining whether the response from the first node arrived before the period of time elapsed; and instructions for, if the response from the first node did not arrive, determining that the installation of the first rule failed.

18. The non-transitory storage medium of claim 14, further comprising instructions for, if the installation of the first rule was successful:
determining whether the transmission of the second rule to the second node is critical or non-critical;

if the transmission of the second rule to the second node is critical:
waiting, after transmitting the second rule to the second node, for a period of time for a response from the second node,
determining from the response from the second node whether the installation of the second rule at the first node failed or succeeded,
if the installation of the second rule succeeded:
transmitting a third rule of the first rule set to a third node for installation of the third rule, and
if the installation of the second rule failed:
refraining from transmitting the third rule to the third node; and
if the transmission of the second rule to the second node is non-critical:
immediately transmitting the third rule to the third node for installation.

19. The non-transitory storage medium of claim 14, wherein the second rule is the first rule.

20. The non-transitory storage medium of claim 14, wherein the requesting node is either the first node or the second node.

* * * * *